United States Patent [19]
Bachmann et al.

[11] Patent Number: 5,677,362
[45] Date of Patent: Oct. 14, 1997

[54] ACTINIC RADIATION-CURABLE FORMULATION

[75] Inventors: Andrew G. Bachmann, Harwinton; Stephen E. Cantor, Cheshire, both of Conn.

[73] Assignee: Dymax Corporation, Torrington, Conn.

[21] Appl. No.: 743,470

[22] Filed: Nov. 4, 1996

Related U.S. Application Data

[63] Continuation of Ser. No. 406,506, Mar. 20, 1995, abandoned.

[51] Int. Cl.$^6$ ............................................. C08F 2/46
[52] U.S. Cl. ..................... 522/28; 522/29; 522/64; 522/66; 522/913
[58] Field of Search ........................ 522/28, 29, 64, 522/66, 913

[56] References Cited

U.S. PATENT DOCUMENTS

| | | | |
|---|---|---|---|
| 4,223,115 | 9/1980 | Zalucha et al. | 525/455 |
| 4,348,503 | 9/1982 | Bachmann | 525/455 |
| 4,605,465 | 8/1986 | Morgan | 522/27 |
| 5,334,625 | 8/1994 | Ibsen et al. | 523/115 |
| 5,547,713 | 8/1996 | Alvarado | 427/493 |

OTHER PUBLICATIONS

"Hysol Liquid Encapsulants For Microelectronic Applications" The Dexter Corporation (4 Pages) Jan. 1991.

"Hysol FP4450 Low Corrosion Chip Coating" The Dexter Corporation (11 Pages) Oct. 1993.

"Darocur 4265" Ciba–Geigy Corp. (4 Pages) 1992.

"Preliminary Product Data CGI 1700" Ciba–Geiby Corp. (6 Pages) 1994.

"Acetylphosphine Oxides as Photoinitiators for Pigmented coatings" Journal of Radiation Curing, vol. 21, No. 2 1994 (pp. 2, 4–9).

"Lucirin TPO" BASF Corporation (4 Pages) Apr. 1994.

"Novel High Performance Bisacylphosphine Oxide (BAPO) Photoinitiators" Ciba–Geigy Corporation (22 Pages) 1994.

"The Seven Sins of Globbing" The Dexter Corporation (8 Pages) Jul. 1993.

*Primary Examiner*—Mark Chapman
*Attorney, Agent, or Firm*—Ira S. Dorman

[57] ABSTRACT

An acrylate encapsulation formulation reacts at a high rate of speed, when exposed to radiation inclusive of wavelengths in the ultraviolet and the visible range, to initially produce a relatively thick skin and to ultimately cure to a relatively low-stress deposit having good physical definition and surface properties. The method entails exposure of the formulation, on an object, to radiation for initialing photopolymerization and thermal polymerization, and the apparatus includes closely juxtaposed actinic radiation and thermal energy sources.

18 Claims, 2 Drawing Sheets

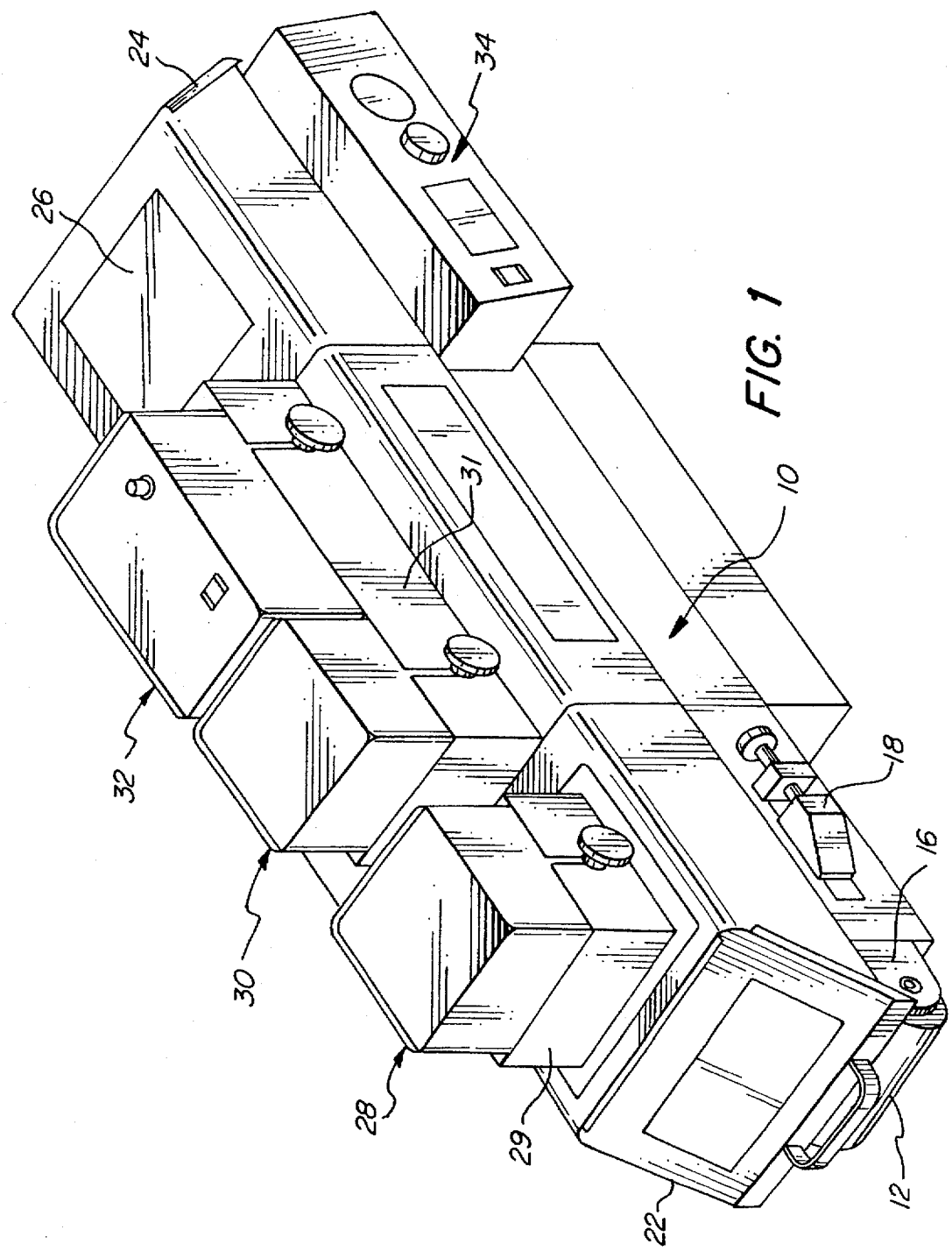

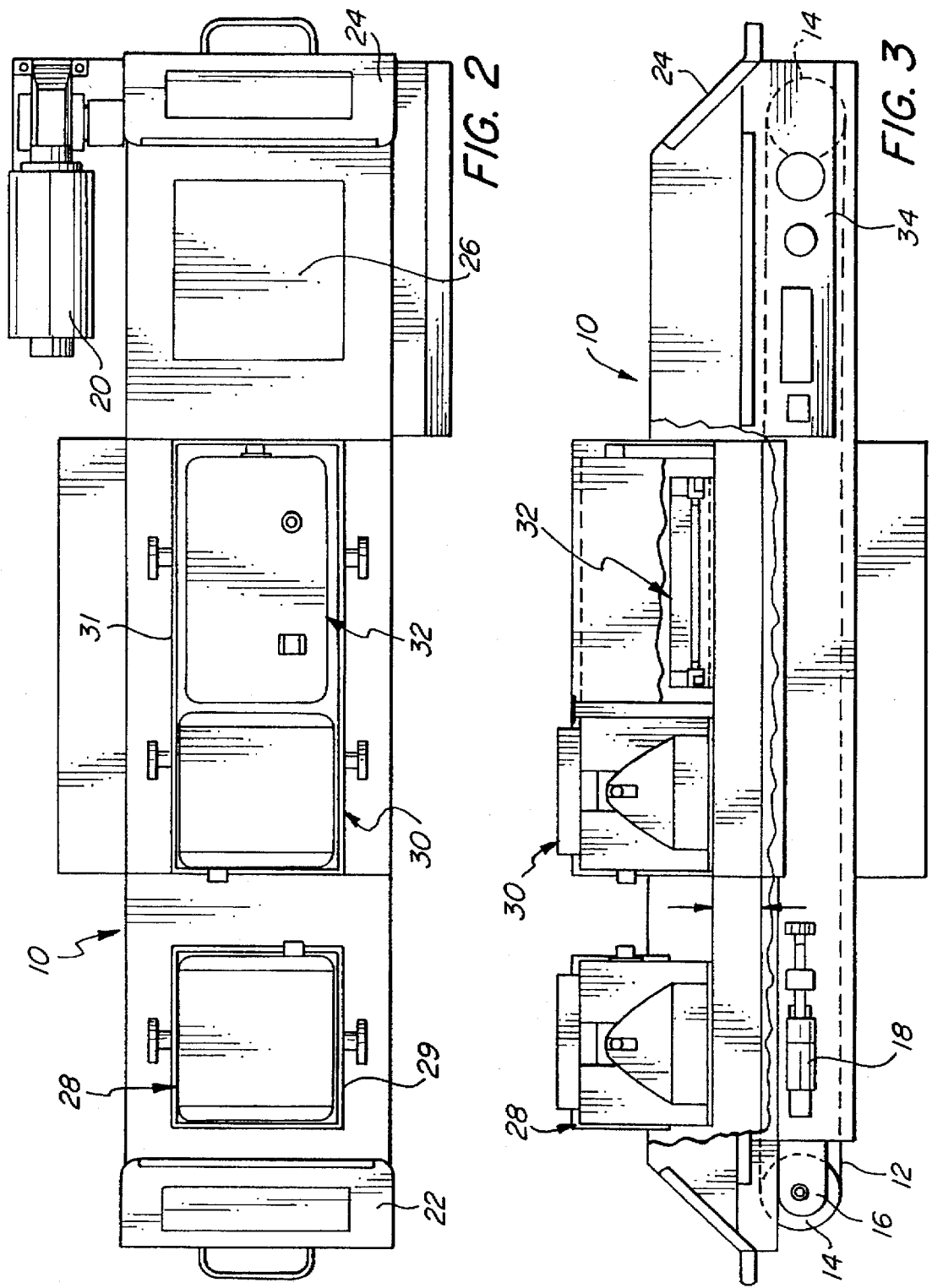

ACTINIC RADIATION-CURABLE FORMULATION

CROSS REFERENCE TO RELATED APPLICATION

The present application is a continuation of application Ser. No. 08/406,506, filed Mar. 20, 1995 and now abandoned.

BACKGROUND OF INVENTION

Formulations intended for encapsulation applications, e.g., potting or microencapsulation of electronic components, "flip chip" assembly, and the like, will desirably exhibit a rather unique combination of properties. The formulation must of course flow about (and in some cases under) the object that is to be encapsulated, and it must remain in place while curing is proceeding. The latter property is especially important in the so-called "glob top" microencapsulation technique, in which an unconfined deposit of liquid resin (typically about 50 to 250 mils thick) is applied over an electronic chip on a printed circuit board, and is then cured to produce a permanent covering. Similarly, in using a polymerizable formulation for assembling a flip chip (i.e., a chip having solder balls on one surface, for connection to contact points of an underlying circuit grid), the resin that is caused to flow between the chip and the substrate must not escape during the curing phase.

Another characteristic that is particularly important for glob top and potting applications concerns the character of the cured surface. It should be smooth and regular, with good definition and freedom from craters, eruptions, dimples, cracking, and other defects that typically arise from off-gassing, overheating, and poor control of the relative rates and depths at and to which curing occurs on the surface and within the mass of underlying material. And finally, it will usually be advantageous to effect polymerization of the reactive components in as brief a period of time as possible, consistent with the attainment of the other properties that are desired.

Satisfaction of the foregoing criteria is substantially more difficult in those instances in which the encapsulant is opaque to radiation in the visible wavelength range (i.e., 400 nm to 700 nm), as will usually be the case. Formulations employed for microencapsulation and potting of electronic components typically contain black pigmentation to protecting photosensitive components as well as for aesthetic reasons, albeit that white, colored pigments, and other opacifying agents may also be employed.

Epoxy formulations have heretofore been used extensively, if not as a practical matter exclusively, for encapsulation applications of the nature described. They present however a number of serious drawbacks.

Epoxy resins generally require extended cure times at elevated temperatures (commonly one to five hours at 130° C. to 170° C.) as well as a need for thawing from the frozen state in which they are normally stored; thus, processing is slow, and costly requirements for refrigeration, shipping and heating are entailed. Epoxy resins are also somewhat difficult and inconvenient to use: preheating and preparation of the substrate (as by the formation of a separate dam to prevent migration beyond intended confines) is often required; dispensing can be slow and problematic; shelf-life is typically short; reworking to remove faulty deposits is difficult (if possible at all); and the glass transition temperature of the cured resin usually requires filling with a particulate solid in an effort to elevate the $T_g$ and to thereby minimize stress-related problems such as delamination, cracking, and fracture of wire leads.

SUMMARY OF THE INVENTION

Accordingly, it is a broad object of the present invention to provide a novel formulation that is especially well suited for use for encapsulation of an object (e.g., glob top formation, potting and flip-chip assembly), which formulation cures very rapidly to produce a deposit having highly desirable surface properties.

A related object of the invention is to provide such a formulation which affords good reaction control and a highly desirable balance between the surface and internal cure rates of the material, and in which deep curing and a relatively thick skin of cured resin can be produced in a very brief period of time following reaction initiation.

More specific objects are to provide a formulation having the foregoing features and advantages, which formulation cures fully and effectively upon exposure of radiation of appropriate wavelength, despite substantial opacity of the formulation to such radiation, produces a cured deposit having a glass transition temperature lying outside of a broad range (e.g., zero to plus 90° C., and preferably minus 40° C. to plus 110° C.) and which obviates many of the deficiencies of the compositions heretofore used for similar encapsulation applications.

Another broad object of the invention is to provide a novel method for encapsulation of an object, and more particularly an electronic component, which method proceeds at a high rate of speed, and under relatively mild conditions, to produce a deposit exhibiting highly desirable physical characteristics.

An additional broad object of the invention is to provide novel apparatus by which the method of the invention is readily and effectively implemented.

It has now been found that certain of the foregoing and related objects of the invention are attained by the provision of an encapsulation formulation comprising a polymerizable liquid acrylate composition that is substantially opaque to a band of radiation lying at least partially within the ultraviolet range and at least partially within the visible range, and a catalyst system including a photoinitiator component and a thermal initiator component. Each of the catalyst components is responsive for initiating polymerization of the acrylate composition, with the photoinitiator component being responsive to radiation throughout the band of substantial opacity of the acrylate composition and with the thermal initiator component being responsive to temperatures below about 120° C.

A formulation in which the polymerizable composition transmits less than 30 percent of incident radiation in a given band will, in accordance herewith, normally be considered "substantially opaque." The band of opacity will commonly encompass a range of from about 200 nm to at least about 410 nm, and will usually result from the inclusion of a black pigment or other opacifying agent.

Although the preferred photoinitiator component will comprise a phosphine oxide compound, other photoactive compounds, such as perfluorinated diphenyl titanocene compounds, may also be employed; the photoinitiator component may comprise two or more photoactive compounds, if necessary or desirable. The thermal initiator component will preferably require heating to a temperature of at least 60° C., and no higher than 80° C.; it will normally comprise an active oxygen compound, which may advantageously be of anaerobic character.

Other objects of the invention are attained by the provision of a method for the encapsulation of an object, using an encapsulation formulation comprised as herein described. The formulation is applied to an object and is exposed, in a first irradiation stage, to radiation throughout the band of opacity of the acrylate composition. Photopolymerization, and immediately thereafter thermal polymerization, of the composition is thereby initiated, with the formulation being heated inherently to a temperature below about 120° C., and preferably in the range 60° C. to 80° C., and with irradiation being continued for a period sufficient to produce substantial polymerization.

In preferred embodiments the method includes a sequential irradiation stage in which the formulation is exposed to radiation in the infrared spectral region so as to hold, for an additional period of time, the temperature at substantially the value attained in the first irradiation stage, to thereby produce further polymerization. The total amount of energy to which the formulation is exposed, throughout the entire course of the method, will preferably be in the range 5 to 100 Joules/cm$^2$, more preferably in the range 6 to 75 Joules/cm$^2$, and most desirably in the range 15 to 45 Joules/cm$^2$, with the composition being substantially completely polymerized in a period not in excess of five minutes, and preferably in two minutes or less.

The method will usually include the further step of placing an object upon a substrate prior to the formulation-application step, and causing the formulation to at least partially cover the substrate as well as the object. The method is utilized to particular benefit in those instances in which a portion of the object is spaced from the substrate, such that some of the formulation flows therebetween, and in which the object is an electronic component having at least one attached wire.

Additional objects of the invention are attained by the provision of apparatus for use in curing a reactive formulation comprised as herein described, which apparatus includes conveyor means for continuously carrying a workpiece along a travel path in a forward direction, from an upstream end toward a downstream end, a first source of actinic radiation, and a thermal energy source; it is devoid of means for actively removing substantial thermal energy. The first source of radiation is disposed adjacent the travel path and the upstream end of the conveyor means, for exposing a workpiece to radiation in a band lying at least partially within the ultraviolet range and at least partially within the visible range (desirably encompassing 200 nm to 410 nm). The thermal energy source will normally be disposed directly adjacent to, and downstream of, the first source, albeit that it may be coincident therewith; it supplies thermal energy to the workpiece while it is being carried by the conveyor means along the travel path, inclusive of a period during which the workpiece is also exposed to radiation from the first source.

The thermal energy source will usually supply radiation in the infrared spectral region, and the source of actinic radiation will advantageously comprise a plurality of lamps. In preferred forms of the apparatus the travel path length will be six feet or less and the total length throughout which the workpiece will be subjected to radiation from the first source, and to energy from the thermal energy source, will not exceed four feet.

BRIEF DESCRIPTION OF THE DRAWINGS

FIG. 1 is a perspective view showing apparatus embodying the present invention;

FIG. 2 is a plan view of the apparatus of FIG. 1, drawn to a reduced scale; and

FIG. 3 is a side elevational view of the apparatus, drawn to the scale of FIG. 2 and having portions broken away to expose internal features.

DETAILED DESCRIPTION OF THE ILLUSTRATED AND PREFERRED EMBODIMENTS

Turning now to FIGS. 1 through 3 of the drawings, therein illustrated is apparatus embodying the present invention. It includes an elongated housing, generally designated by the numeral 10, along the lower portion of which extends a continuous conveyor 12, carried by pulleys mounted upon appropriate structure 16. Tension in the conveyor 12 is adjusted by the mechanism 18, and power for driving it is provided by a motor 20. Access doors 22 and 24 are hingedly attached to the housing 10 at the upstream (or onload) end and downstream (or off-load) end, respectively, and a transparent panel 26 is mounted in the top wall of the housing to enable viewing of the parts as they approach the off-load position.

An ultraviolet lamp assembly, generally designated by the numeral 28, is supported by appropriate structure 29 adjacent the inlet end of the conveyor 12 and along the travel path established thereby; the assembly is mounted for adjustment of the spacing of the lamp from the conveyor surface, and it illuminates an area measuring about 6 inches by 6 inches. A second such ultraviolet lamp assembly, generally designated by the numeral 30, is similarly supported by mounting structure 31, as is an infrared lamp assembly, generally designated by the numeral 32; radiation from the IR lamp covers about 10 inches of the travel path length. As will be appreciated, the close positioning of the infrared lamp assembly to the second ultraviolet lamp assembly 30, along the workpiece travel path, ensures that radiation from the infrared lamp will overlap that produced by the UV lamp. The temperature of any part subjected to the radiation from the UV lamp will thereby be maintained without significant reduction, until curing is substantially complete. The use of two UV lamp assemblies 28, 30 ensures the adequacy of irradiation of the object, and the lamps are sufficiently close to one anther to effectively constitute a single radiation source. Additional UV units could be employed for temperature maintenance (as could convective or conductive heat sources) if so desired, but IR heating is most economical, efficient and convenient, and is therefore the most preferred option.

It will be self evident that objects coated with an encapsulating liquid, formulated in accordance with the present invention, are loaded onto the conveyor 12 through the open door 22 for sequential transport past the UV lamp assemblies 28 and 30, and then immediately past the IR source of assembly 32. When the part reaches the outlet end of the conveyor the deposit will be substantially fully cured. Operation of the conveyor 12 is controlled from a panel, generally designated by the numeral 34, and it will be appreciated that other conveyor means (such as a rotating timing table) may be employed, where appropriate; controls for the UV and IR lamps are located directly on the associated power supplies.

Exemplary of the efficacy of the present invention are the following specific examples, wherein all percentages are on a weight basis.

Example One

A master batch formulation is prepared by admixing the following ingredients in the percentages set forth in parentheses: hydroxy ethyl methacrylate monomer (17.51), isobornyl acrylate monomer, (35.04), a cellulose ester-based oligomer (30.65), acrylic acid (4.36), stabilizing, leveling, adhesion-promoting, and thickening ingredients (11.64, combined), and black pigment (0.80). The master batch and each of several polymerization initiators are admixed, and are tested by subjecting the resultant formulations, deposited as globs about ⅛ to 1/16 inch thick on a composite FR-4 printed circuit board substrate, to various radiation conditions so as to effect curing; irradiation is carried out on the apparatus described with reference to FIG. 1 through 3. The several formulations produced are defined in Table One, which follows, wherein the percentages of the ingredients employed are set forth:

TABLE ONE

| Ingredients | 1 | 2 | 3 | 4 | 5 | 6 | 7 | 8 | 9 | 10 | 11 |
|---|---|---|---|---|---|---|---|---|---|---|---|
| MB | 94.5 | 96.5 | 96.5 | 97.25 | 96.0 | 94.5 | 93.5 | 94.0 | 91.5 | 93.5 | 93.5 |
| BPO | 0.4 | 0.4 | | | | | | | 0.4 | 0.4 | 0.4 |
| D-1173 | 1.1 | 1.1 | 0.75 | | | | | | 1.1 | 1.1 | 1.1 |
| I-651 | 1.5 | | | | | | | | | | |
| I-184 | 0.5 | | | | | 3.5 | | | | | |
| TBPO | 2.0 | 2.0 | 2.0 | 2.0 | 2.0 | 2.0 | 2.0 | 2.0 | | | |
| TPO | | | 0.75 | 0.75 | | | | | | | |
| I-369 | | | | | 2.0 | | | | | | |
| C-784 | | | | | | 3.5 | | | | | |
| ITX | | | | | | | 1.5 | | | | |
| Amine | | | | | | | 3.0 | 3.0 | | | |
| CQ | | | | | | | | 1.0 | | | |
| CHP | | | | | | | | | 2.0 | 2.0 | 2.0 |
| Saccharin | | | | | | | | | 2.0 | 2.0 | 2.0 |
| TBA | | | | | | | | | 3.0 | | |
| APH | | | | | | | | | | 1.0 | |
| DMPT | | | | | | | | | | | 1.0 |

As used in the foregoing Table, the following abbreviations apply:

MB=master batch

BPO=bis (2,6-dimethoxybenzoyl)-2,4,4-trimethylpentyl phosphine oxide

TPO=2,4,6-trimethylbenzoyldphenylphosphine oxide tBPO=t-butyl peroctoate tBPB=t-butyl perbenzoate D1173=2-hydroxy-2-methyl-1-phenyl propan-1-one I-651=2,2-dymethoxy-2-phenylacetophenone I-184=1-hydroxycyclohexyl phenyl ketone I-369=2-benzyl-2-N,N-dimethylamino-1-(4-morpholinophenyl)-1-butanone C-784=bis($\eta^5$-2,4-cyclopentadien-1-yl)bis{2,6-diflouro-3-1H-pyrrol-1-yl)phenyl}titanium ITX=isopropyl thioxanthone CQ=camphor quinone Amine=N,N-dimethyl aminopropyl acrylamide CHP=cumene hydroperoxide TBA=tributylamine APH=acetyl phenyl hydrazine DMPT=dimethyl paratoluene The abbreviations having the "I" prefix designate IRGA-CURE products, and that having the "D" prefix is a DAROCUR product, and the full designation of "C-784" is CGI-784, all of which products are available from Ciba-Geigy Chemical Co. Only 50% of the C-784 photoinitiators constitutes the active ingredient.

Table Two, set forth below, reports the conditions under which the several formulations are cured, and characterizes the state of cure produced in each instance:

TABLE TWO

| Radiation | Speed | 1 | 2 | 3 | 4 | 5 | 6 | 7 | 8 | 9 | 10 | 11 |
|---|---|---|---|---|---|---|---|---|---|---|---|---|
| A. UV | 0.5 | TC | A | A | A | A | TC | | | | | |
| B. UV | 1.0 | NC | NC | NC | NC | NC | NC | G | A | NC | NC | G |
| C. UV | 1.0 | TC | TC | TC | TC | A | TC | | | | | |
| D. UV + IR | 1.5 | TC | A | TC | TC | A | TC | | | | | |
| E. UV + IR | 2.0 | NC | NC | NC | NC | NC | S | | | | | |
| +14 hours | | | | | | | | | | + | NC | PC |
| +24 hours | | | | | | | | | | ++ | NC | TC |

As used in the foregoing table, the following abbreviations apply: "TC" means the formulation totally cured; "A" means full cure occurred except in a small void area at the bottom of the deposit; "NC" means that a substantial skin was produced; "G" indicates that the formulation gelled (a marginal result); "S" indicates a soft product; "PC" stands for partial curing, and the signs "+" and "++" indicate an increase and a further increase, respectively, in the thickness of the skin that developed on the formulation following resting under ambient conditions for the indicated number of hours. Speeds are expressed in feet per minute.

As noted above, the path length through the apparatus irradiated by the two UV lamps is roughly one foot, and that which is irradiated by the IR lamp is about 10 inches. Accordingly, subjecting the deposit to UV radiation alone, with the conveyor operating at a speed of 0.5 foot per minute, would for example expose the formulation to actinic radiation for approximately two minutes. In instances in which both the UV and the IR lamps are operated, total irradiation would be approximately two minutes at a rate of one foot per minute. The UV lamp employed is commercially available from Dymax Corporation of Torrington, Connecticut, under the designation Dymax 5000 E C; it produces radiation throughout the range 200 nm to 500 nm, and is rated at about 550 milliwatts/cm$^2$. The IR lamp is the Dymax THERMA-CURE 1000 GT unit, and delivers about 500 milliwatts/cm$^2$.

Under the conditions established, the total energy levels to which the deposits are subjected are about 66 Joules/cm$^2$ with UV alone at 0.5 feet per minute, about 33 Joules/cm$^2$ with UV alone at 1.0 foot per minute, about 58 Joules/cm$^2$ with UV plus IR at 1.0 foot per minute, about 41 Joules/cm$^2$ with UV plus IR at 1.5 feet per minute, and about 29 Joules/cm$^2$ with UV plus IR at 2.0 feet per minute.

The photoinitiator components of all formulations absorb strongly in the UV range. In addition, however, the combination employed in formulations 1, 2, 9, 10 and 11 extends the range of substantial absorption to about 425 nm, and that of formulation 3 extends absorption to about 410 nm. The longest wavelengths of substantial absorption exhibited by the photoactive compounds of formulations 4, 5, 6, 7 and 8 are about 410 nm, 410 nm, 450 nm, 410 nm, and 510 nm, respectively.

From the data in the foregoing Tables, it can be seen that all formulations embodying the present invention cure to at least adequate levels at high rates of speed; in all instances, the surfaces are tack free and are of high quality. The data also indicate that, while the phosphine oxides produce the most desirable results, other photoinitiators that respond within the visible range of wavelengths are also effective (e.g., as demonstrated by formulations numbers 7 and 8). Comparison of runs B and C of Tables Two shows the desirable effects of temperature maintenance. In both instances the deposit is brought to a temperature of 60° C. to 70° C. solely by exposure to radiation from the UV lamps, but in run "C" the IR lamp is used to maintain that temperature in the deposit for an additional period of time. As can be seen, complete curing is achieved as a result, without a decrease of operating speed.

The data reported with respect to formulations 9, 10 and 11 demonstrate the use of anaerobic initiator systems in the formulations of the invention. As can be seen, increases in skin thickness and ultimate cure levels can be realized by allowing dwell times at ambient following irradiation.

In all instances, the formulations are seen to cure without significant migration from the boundaries of the applied deposit, and the surfaces produced are free from irregularities, cracking, and other defects. Not only do these characteristics show the suitability of the formulations for glob top, potting, and other encapsulation techniques, but they also demonstrate that use of the formulations obviates any need to form a dam on the substrate for confinement of the encapsulating composition, as in flip-chip assembly operations. In addition, the thermal curing properties of the instant formulations render them highly valuable in applications in which shadow-curing is necessary, as is commonly true for adequate microencapsulation.

In this regard, it is evident that a synergistic effect is produced by the combination of the photo-active initiator component and the thermal initiator component of the instant formulations. Following exposure to actinic radiation, to produce the confining and immobilizing skin, heat that is inherently developed within the mass of the deposit, due to its absorption characteristics, initiates thermal curing without need for a separate heat source and without undue elevation of the ambient temperature. By use of the instant apparatus, moreover, the heating effect is maintained without any interim cooling, as would necessitate reheating and would produce stresses leading to distortion, cracking and possible damage of the encapsulated component.

Example Two

A series of formulations, 1A through 7A, are produced having the same compositions as formulations 1 through 7 of Example One, respectively, but from which the thermal initiator is omitted. Parallel tests are carried out by exposing the modified and unmodified formulations to radiation under the conditions of run "C" (Table Two), after which the depths of cure are measured. Each formulation is contained as an upright column in a fixture that is shielded to permit light to enter only through an area at the top. The results are as follows (depths, in mils, are expressed within parentheses following the test number): 1 (30), 1A (28); 2 (31), 2A (27); 3 (43), 3A (29); 4 (37), 4A (27); 5 (27), 5A (19); 6 (42), 6A (immeasurable); 7 (13), 7A (9). Thus, it is again seen that thermal initiation is effective despite the absence of any heat supply, per se.

As will be appreciated, the essential ingredients of formulations embodying the present invention comprise a polymerizable liquid acrylate composition and a catalyst system, including a photoinitiator component and a thermal initiator component. The photoinitiator component will absorb radiation throughout a band that includes the visible region of the spectrum and that extends well into the ultraviolet region; the photoinitiator component absorption range will preferably encompass the range 200 nm to 410 nm, and will most desirably extend beyond those limits, especially at the upper end. It has been found that affording absorption in the visible range enables the production of much thicker skins than can be produced using UV alone, e.g., 30 mils versus 1 to 5 mils in a typical case; it also tends to enable initiation of curing directly on the encapsulated part, as is highly desirable. Absorption in the UV range is found to best produce a tack-free surface on the deposit.

The photoinitiator component may comprise virtually any photo-active compound, as long as it satisfies the stated wavelength-response criteria, is compatible with the other ingredients of the formulation, and does not lead to excessive vaporization. Suitable photoinitiators in addition to those identified above will be evident to those skilled in the art. The thermal initiator may similarly constitute any compound that is capable of initiating polymerization at a temperature in the selected range. Normally, the thermal initiator will constitute an active oxygen compound; in addition to the compounds identified above, diacyl peroxides such as 2,4-dichloro benzoyl peroxide and lauroyl peroxide, peroxydicarbonates such as di(n-propyl) peroxydicarbonate, peroxyesters such as t-butylperoxypivalate, organosulfonyl peroxides such as acetyl cyclohexylsulfonylperoxide, hydroperoxides such as t-butyl hydroperoxide, and the like, might also be mentioned as suitable catalysts.

The relative proportions of the ingredients of the initiator system may vary widely, depending upon the particular initiators employed, the ingredients of the polymerizable composition, and the conditions of operation; the selection will generally be made so as to achieve an optimal balance of curing conditions. Typically however, each photoinitiator component will constitute about 0.25 to 10, and preferably 0.5 to 4, weight percent of the formulation.

Reactive acrylate monomers that are suitable for use in the instant formulations include of course both monofunctional and polyfunctional acrylates and methacrylates. They will generally be reaction products of acrylic acid and/or methacrylic acid with one or more mono- or poly-basic, substituted or unsubstituted, alkyl ($C_1$ to $C_{18}$), aryl or aralkyl alcohols. Acrylates in which the alcohol moiety contains a polar substituent (e.g., an hydroxyl, amine, halogen, cyano, heterocyclic or cyclohexyl group) will often be preferred because crosslinking, or other intermolecular bonding, is promoted thereby. Suitable such monomers and prepolymers are well known in the art, and are in part disclosed for example at line 53, column 6, through line 35, column 7 of Bachmann et al U.S. Pat. No. 4,429,088, and at line 14, column 4 through line 52, column 5 of U.S. Pat. No. 4,451,523. Nevertheless, it might be noted that the following acrylates and corresponding methacrylates (the methacrylate compounds being preferred in many instances) are especially suitable for use in the present compositions, alone or in combination with one another: hydroxyethylacrylate, isobornyl acrylate, tetrahydrofurfuryl acrylate, diethyleneglycol diacrylate, 1,4-butanediol diacrylate, butylene glycol diacrylate, neopentyl glycol diacrylate, octylacrylate and decylacrylate (normally in admixture), polyethyleneglycol diacrylate, trimethylcyclohexyl acrylate, benzyl acrylate, butyleneglycol diacrylate, polybutyleneglycol diacrylate, tripropyleneglycol diacrylate, trimethylolpropane triacrylate, di-trimethylolpropane tetraacrylate, pentaerythritol tetraacrylate, and di-pentaerythritol pentaacrylate. About 1 to 10 weight percent of acrylic acid will beneficially be employed, to increase adhesion. It should be appreciated that the liquid acrylate composition of the instant invention may contain up to about 5% by weight of copolymerizable monomers such as vinyl ether, allyl compounds, and other monomers that will be evident to those skilled in the art, if so desired.

A free-radical reactive oligomer will normally be included in the composition (alone or, where appropriate, in combination with a cationic-reactive oligomer), but it should be appreciated that such a product is not necessary to the attainment of the cure properties desired herein. Oligomers suitable for use comprise vinyl polymers, acrylic polymers, polyester elastomers, glycol polymers, acrylated epoxies, natural and synthetic rubbers, polyester acrylates, epoxy acrylates, polyether acrylates, alkyd acrylates, polyol acrylates, and the like. However, the use of the urethane polymers and prepolymers will often be found most beneficial, with the latter being especially desirable due to the potential that they afford for further reaction of their pendant isocyanate groups with a reactive functionality (e.g., an hydroxyl, amine, or sulfhydro group) provided by a suitable acrylate monomer. Diisocyanate-capped polyethers and polyesters, acrylated by reaction with hydroxyethyl acrylate or hydroxyethyl methacrylate and having a molecular weight of about 400 to 6,000, are particularly preferred.

Other materials may be incorporated into the instant compositions in addition to the components hereinabove described. For example, "inert" fillers such as wood flour, cornstarch, glass fibers, cotton linters, mica, alumina, silica, and the like, may be used to modify viscosity, improve impact resistance, and for other purposes, and it is conventional to include small percentages of silane coupling agents to increase moisture resistance as well as to enhance bond strength to glass and similar surfaces. Substances such flame retarders, stabilizers (e.g., the quinones and hydroquinones), viscosity modifiers (thixotropes, thickeners, viscosity reducers), plasticizers, antioxidants, and the like, may be incorporated as well.

Despite the foregoing, it should be appreciated that the instant formulations inherently afford desirable glass transition temperatures, without need for extension by the incorporation of particulate fillers, as is often necessary in the epoxy formulations currently in use. By their nature, therefore, the acrylic formulations obviate any need for close matching of thermal expansion coefficients, and avoid cracking of the deposits, breakage of leads to components, and similar stress-induced difficulties. Also unlike the epoxy resins presently employed, the formulations of the instant invention cure very rapidly (and even more so when they contain no opacifying agent), they require no difficult storage conditions or costly equipment for refrigeration and heating, they require no preheating or preparation of the substrate, dispensing is facile, shelf-life is long, and they can usually be readily removed by peeling from a surface, if necessary. Although the avoidance of low-temperature storage will normally be considered advantageous, it will be appreciated that the instant formulations may contain thermal initiators that respond at temperatures lower than 60° C., if so desired. The feature of producing a relatively thick skin upon exposure to actinic radiation avoids the need for formation of any dam or like preparation for preventing migration of the uncured material from the desired site, and is of course primarily responsible, in a broader sense, for preserving the shape and spatial integrity of the deposit while also affording the high levels of resistance to gas pressure, and other forces, that are realized.

Thus, it can be seen that the present invention provides a novel formulation that is especially well suited for use for encapsulation of an object, which formulation cures very rapidly to produce a deposit having highly desirable surface properties. The formulation affords good reaction control and a highly desirable balance between the surface and internal cure rates of the material, and it enables deep curing and a relatively thick, tack-free skin of cured resin to be produced in a very brief period of time following reaction initiation. Cure is achieved fully and effectively upon exposure to radiation of appropriate wavelength, despite substantial opacity of the formulation to such radiation, and a cured deposit is produced having a glass transition temperature lying outside of a broad range (e.g., zero to plus 90° C., and preferably minus 40° C. to plus 110° C.), which obviates many of the deficiencies of the compositions heretofore used for similar encapsulation applications.

The invention also provides a novel method for encapsulation of an object, and more particularly an electronic component, which method proceeds at a high rate of speed, and under relatively mild conditions, to produce a deposit exhibiting highly desirable physical characteristics. The invention further provides novel apparatus by which the instant method is readily and effectively implemented.

Having thus described the invention, what is claimed is:

1. An actinic radiation-curable formulation, comprising: a polymerizable liquid acrylate composition that contains an opacifying agent to render it substantially opaque to a band of radiation lying at least partially within the ultraviolet range and at least partially within the visible range, said composition transmitting less than 30 percent of radiation in said band, incident thereupon; and a catalyst system including a photoinitiator component and a thermal initiator component, each of said catalyst components being responsive for initiating polymerization of said acrylate composition, said photoinitiator component being responsive to radiation throughout said band and being selected from the group consisting of phosphine oxide compounds, perfluorinated diphenyl titanocene compounds, and mixtures thereof, said thermal initiator component being responsive to temperatures below about 120° C.

2. The formulation of claim 1 wherein said band of radiation encompasses a range up to at least about 410 nm.

3. The formulation of claim 2 wherein said composition contains a black opacifying agent.

4. The formulation of claim 1 wherein said photoinitiator component comprises at least two photoactive compounds.

5. The formulation of claim 1 wherein said photoinitiator component comprises a phosphine oxide compound.

6. The formulation of claim 1 wherein said photoinitiator component comprises a perfluorinated diphenyl titanocene compound.

7. The formulation of claim 1 wherein the range of temperatures to which said thermal initiator component is responsive is about 60° C. to 80° C.

8. The formulation of claim 1 wherein said thermal initiator component comprises an active oxygen compound.

9. The formulation of claim 1 wherein said thermal initiator component is of anaerobic character.

10. An actinic radiation-curable formulation, comprising: a polymerizable liquid acrylate composition that contains a black opacifying agent and is substantially opaque to a band of radiation lying at least partially within the ultraviolet range and at least partially within the visible range, and a catalyst system including a photoinitiator component and a thermal initiator component, each of said catalyst components being responsive for initiating polymerization of said acrylate composition, said photoinitiator component being responsive to radiation throughout said band, and said thermal initiator component being responsive to temperatures below about 120° C.

11. The formulation of claim 10 wherein said composition transmits less than 30 percent of radiation in said band, incident thereupon.

12. The formulation of claim 10 wherein said band of radiation encompasses a range up to a least about 410 nm.

13. The formulation of claim 10 wherein said photoinitiator component comprises at least two photoactive compounds.

14. The formulation of claim 10 wherein said photoinitiator component comprises a phosphine oxide compound.

15. The formulation of claim 10 wherein said photoinitiator component comprises a perfluorinated diphenyl titanocene compound.

16. The formulation of claim 10 wherein the range of temperatures to which said thermal initiator component is responsive is about 60° C. to 80° C.

17. The formulation of claim 10 wherein said thermal initiator component comprises an active oxygen compound.

18. The formulation of claim 10 wherein said thermal initiator component is of anaerobic character.

\* \* \* \* \*